(12) United States Patent
Fujimura et al.

(10) Patent No.: US 11,099,559 B2
(45) Date of Patent: Aug. 24, 2021

(54) AUTOMATED DRIVING SYSTEM AND AUTOMATED DRIVING SWITCH DETERMINATION PROGRAM PRODUCT

(71) Applicant: DENSO CORPORATION, Kariya (JP)

(72) Inventors: Tadashi Fujimura, Kariya (JP); Kentaro Nishida, Kariya (JP)

(73) Assignee: DENSO CORPORATION, Kariya (JP)

( * ) Notice: Subject to any disclaimer, the term of this patent is extended or adjusted under 35 U.S.C. 154(b) by 155 days.

(21) Appl. No.: 16/183,180

(22) Filed: Nov. 7, 2018

(65) Prior Publication Data

US 2019/0072957 A1 Mar. 7, 2019

Related U.S. Application Data

(63) Continuation of application No. PCT/JP2017/014098, filed on Apr. 4, 2017.

(30) Foreign Application Priority Data

May 19, 2016 (JP) .............................. JP2016-100468

(51) Int. Cl.
*G05D 1/00* (2006.01)
*G06K 9/00* (2006.01)
(Continued)

(52) U.S. Cl.
CPC ......... *G05D 1/0061* (2013.01); *B60W 50/082* (2013.01); *B60W 50/14* (2013.01);
(Continued)

(58) Field of Classification Search
CPC ................................................. G05D 1/0061
(Continued)

(56) References Cited

U.S. PATENT DOCUMENTS 8,880,273 B1 * 11/2014 Chatham ................ G08G 1/167
701/28
9,365,213 B2 * 6/2016 Stenneth ............... B60W 30/00
(Continued)

FOREIGN PATENT DOCUMENTS

JP 2002-236993 A 8/2002
JP 2007-232390 A 9/2007
(Continued)

OTHER PUBLICATIONS

Google patents english machine translation of Japanese Patent Pub. No. JP2002236993A to Kugo (downloaded on May 5, 2020).*
(Continued)

*Primary Examiner* — Jean Paul Cass
(74) *Attorney, Agent, or Firm* — Maschoff Brennan

(57) ABSTRACT

An automated driving system includes a determiner, a driving switch controller, and a notification controller. The determiner determines each of a plurality of determination items that is a condition for switching from an automated driving to a manual driving. The driving switch controller switches from the automated driving to the manual driving when all of the plurality of determination items are determined as positive. The notification controller notifies a driver of notification information for urging a reaction of the driver when at least one of the plurality of determination items is determined as negative. The determiner determines the at least one or all of the plurality of determination items before a vehicle passes through a switch determination point. The determiner determines the at least one or all of the plurality of determination items when or after the vehicle passes through the switch determination point.

14 Claims, 12 Drawing Sheets

(51) Int. Cl.
*B60W 50/08* (2020.01)
*B60W 50/14* (2020.01)
*G08G 1/16* (2006.01)
*B60W 50/00* (2006.01)

(52) U.S. Cl.
CPC ....... *G05D 1/0088* (2013.01); *G06K 9/00845* (2013.01); *B60W 2050/007* (2013.01); *B60W 2050/0072* (2013.01); *B60W 2050/0096* (2013.01); *B60W 2540/215* (2020.02); *B60W 2540/26* (2013.01); *B60W 2556/50* (2020.02); *B60W 2900/00* (2013.01); *B60Y 2302/05* (2013.01); *G08G 1/16* (2013.01)

(58) Field of Classification Search
USPC .......................................................... 701/23
See application file for complete search history.

(56) References Cited

U.S. PATENT DOCUMENTS

| | | | | |
|---|---|---|---|---|
| 9,606,536 | B2* | 3/2017 | Sato | B60W 50/14 |
| 2012/0083959 | A1* | 4/2012 | Dolgov | B60T 7/22 |
| | | | | 701/23 |
| 2013/0131908 | A1* | 5/2013 | Trepagnier | B60W 30/00 |
| | | | | 701/23 |
| 2014/0222277 | A1* | 8/2014 | Tsimhoni | B60K 35/00 |
| | | | | 701/23 |
| 2015/0314780 | A1* | 11/2015 | Stenneth | G05D 1/0061 |
| | | | | 701/23 |
| 2016/0033964 | A1 | 2/2016 | Sato et al. | |
| 2016/0041553 | A1 | 2/2016 | Sato et al. | |
| 2016/0103449 | A1* | 4/2016 | Desnoyer | G05D 1/0061 |
| | | | | 701/23 |
| 2017/0075349 | A1 | 3/2017 | Sato et al. | |
| 2017/0303842 | A1 | 10/2017 | Yoshida et al. | |
| 2017/0329329 | A1* | 11/2017 | Kamhi et al. | |

FOREIGN PATENT DOCUMENTS

| | | |
|---|---|---|
| JP | 2015-141053 A | 8/2015 |
| JP | 2015-141560 A | 8/2015 |
| JP | 2015-182525 A | 10/2015 |
| JP | 2016-038768 A | 3/2016 |
| WO | 2017/199610 A1 | 11/2017 |

OTHER PUBLICATIONS

International Search Report; International Application No. PCT/JP2017/014098; dated Jun. 27, 2017; 4 pages.

* cited by examiner

AUTOMATED DRIVING SYSTEM AND AUTOMATED DRIVING SWITCH DETERMINATION PROGRAM PRODUCT

CROSS REFERENCE TO RELATED APPLICATION

The present application is a continuation application of International Patent Application No. PCT/JP2017/014098 filed on Apr. 4, 2017, which designated the U.S. and claims the benefit of priority from Japanese Patent Application No. 2016-100468 filed on May 19, 2016. The entire disclosures of all of the above applications are incorporated herein by reference.

TECHNICAL FIELD

The present disclosure relates to an automated driving system and an automated driving switch determination program product.

BACKGROUND ART

An automated driving system for automated driving of a vehicle is provided. In the automated driving system, a technique that switches between the automated driving and manual driving is considered.

SUMMARY

The present disclosure provides an automated driving system and an automated driving switch determination program product capable of appropriately switching from automated driving to manual driving.

In the present disclosure, an automated driving system is provided. The automated driving system determines each of a plurality of determination items that is a condition for switching from an automated driving to a manual driving. When all of the plurality of determination items are determined as positive, the automated driving system switches from the automated driving to the manual driving. When at least one of the plurality of determination items is determined as negative, the automated driving system notifies a driver of notification information for urging a reaction of the driver.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Figure 1:
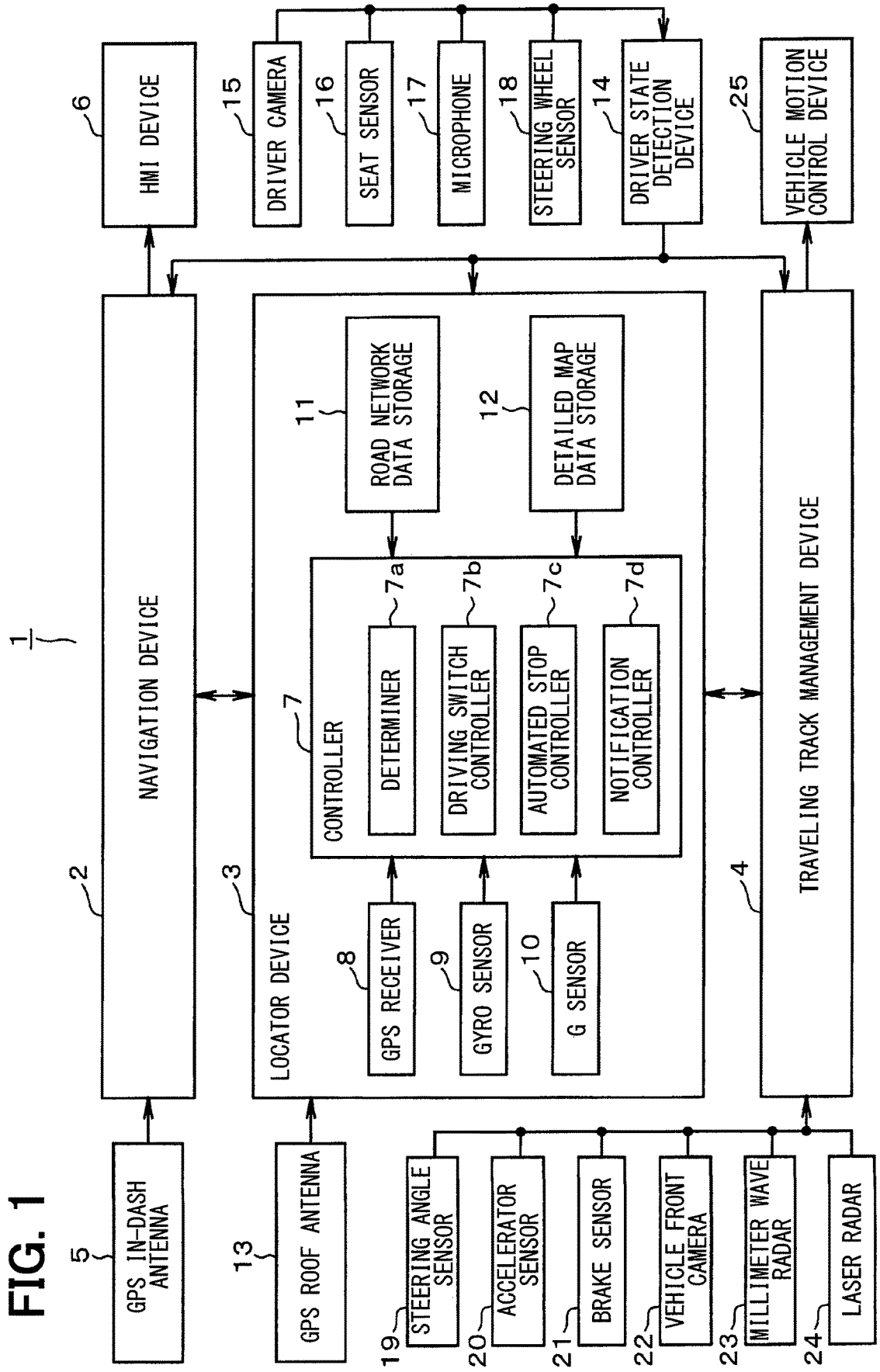
FIG. 1 is a functional block diagram showing one embodiment.
Figure 2:
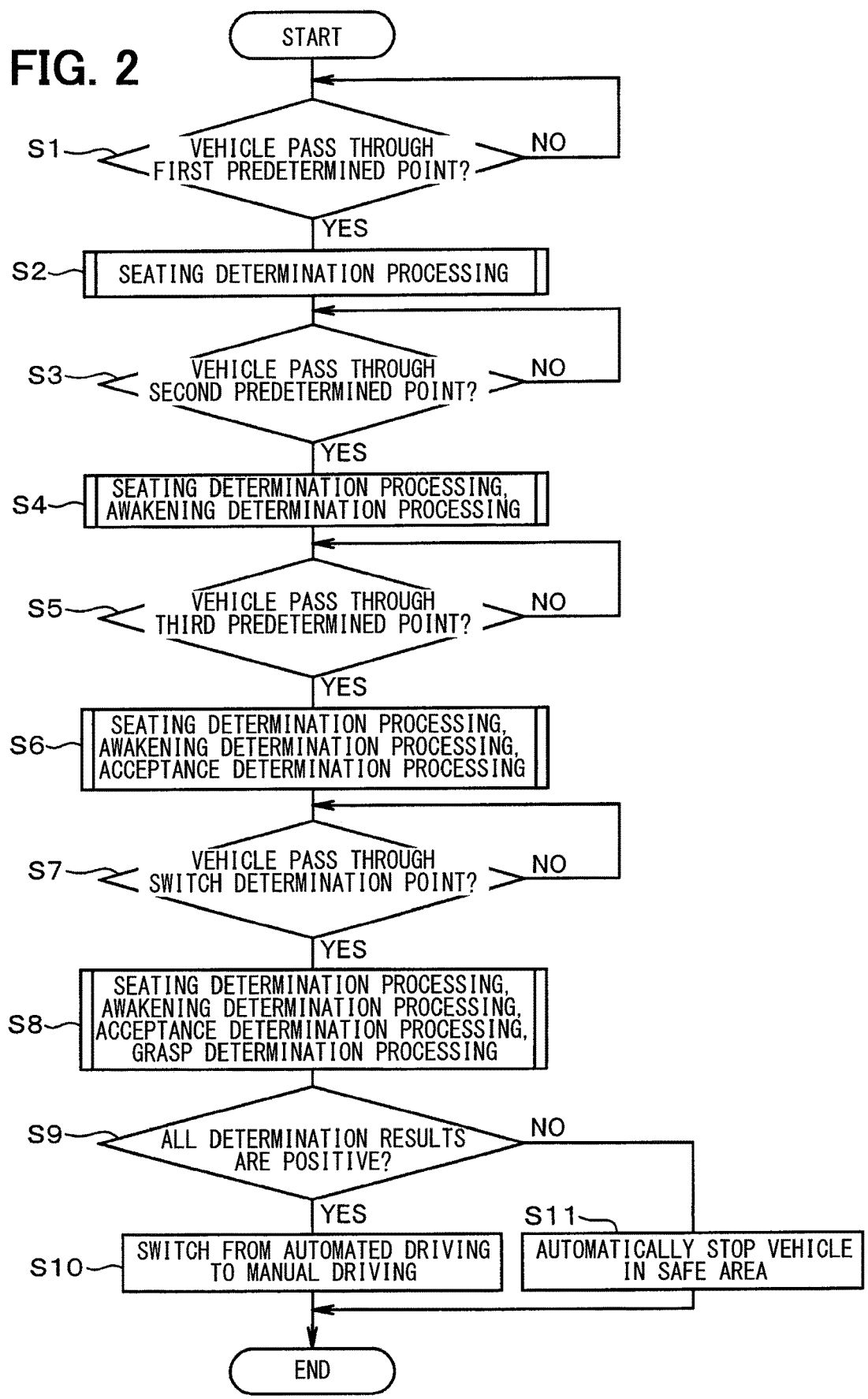
FIG. 2 is a flowchart showing an automated driving switch determination processing.
Figure 3:
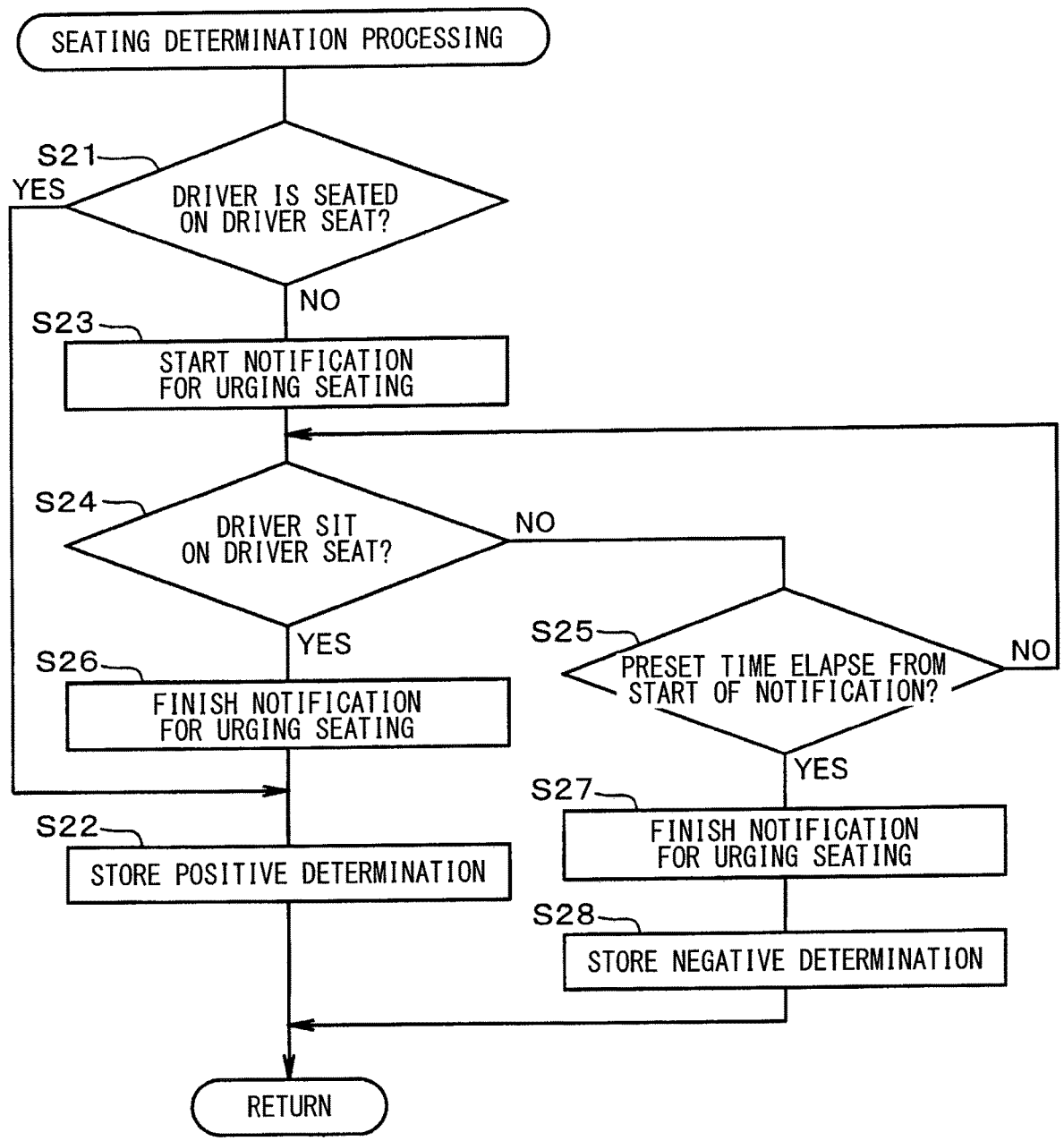
FIG. 3 is a flowchart showing a seating determination processing.
Figure 4:
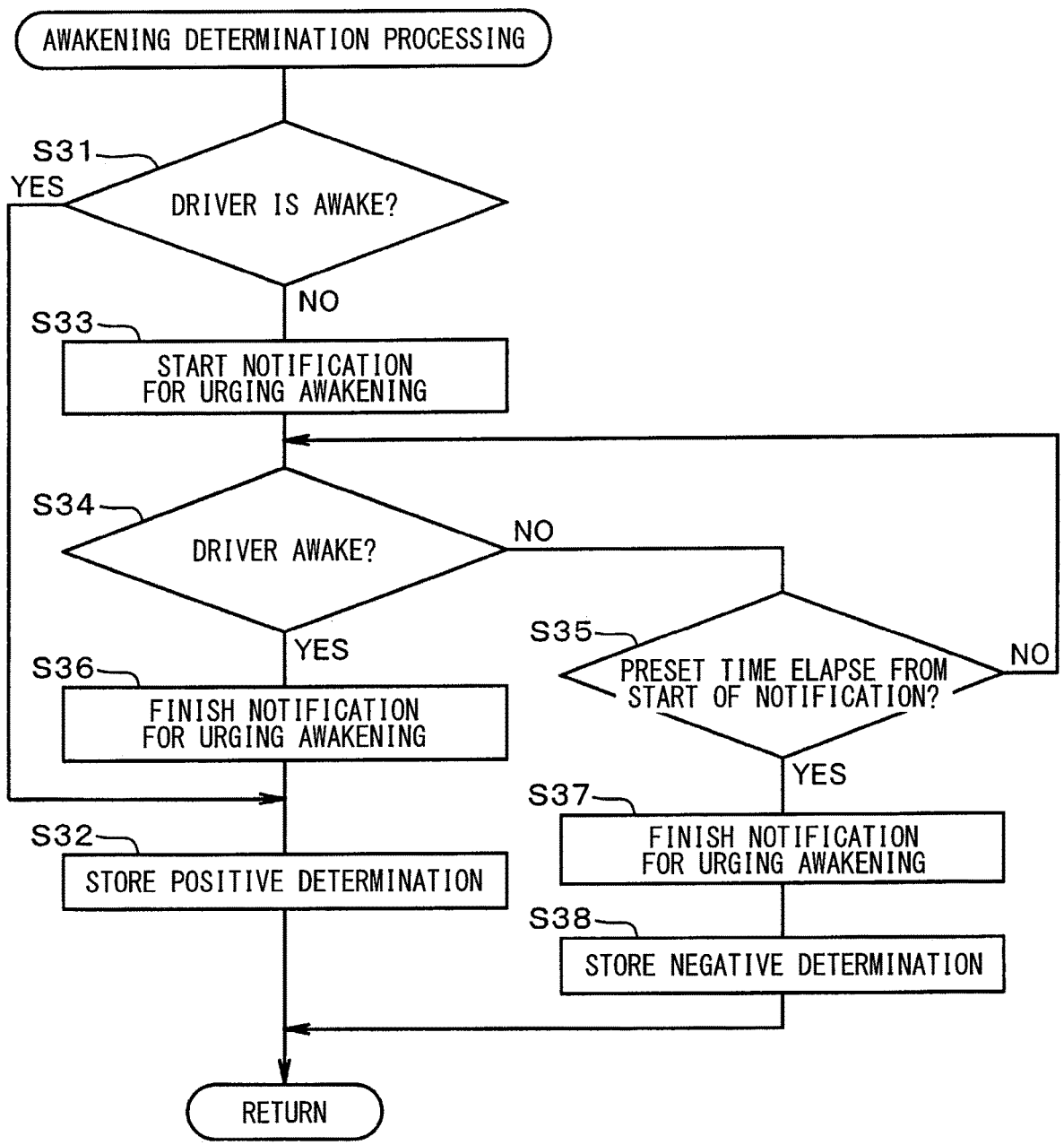
FIG. 4 is a flowchart showing an awakening determination processing.
Figure 5:
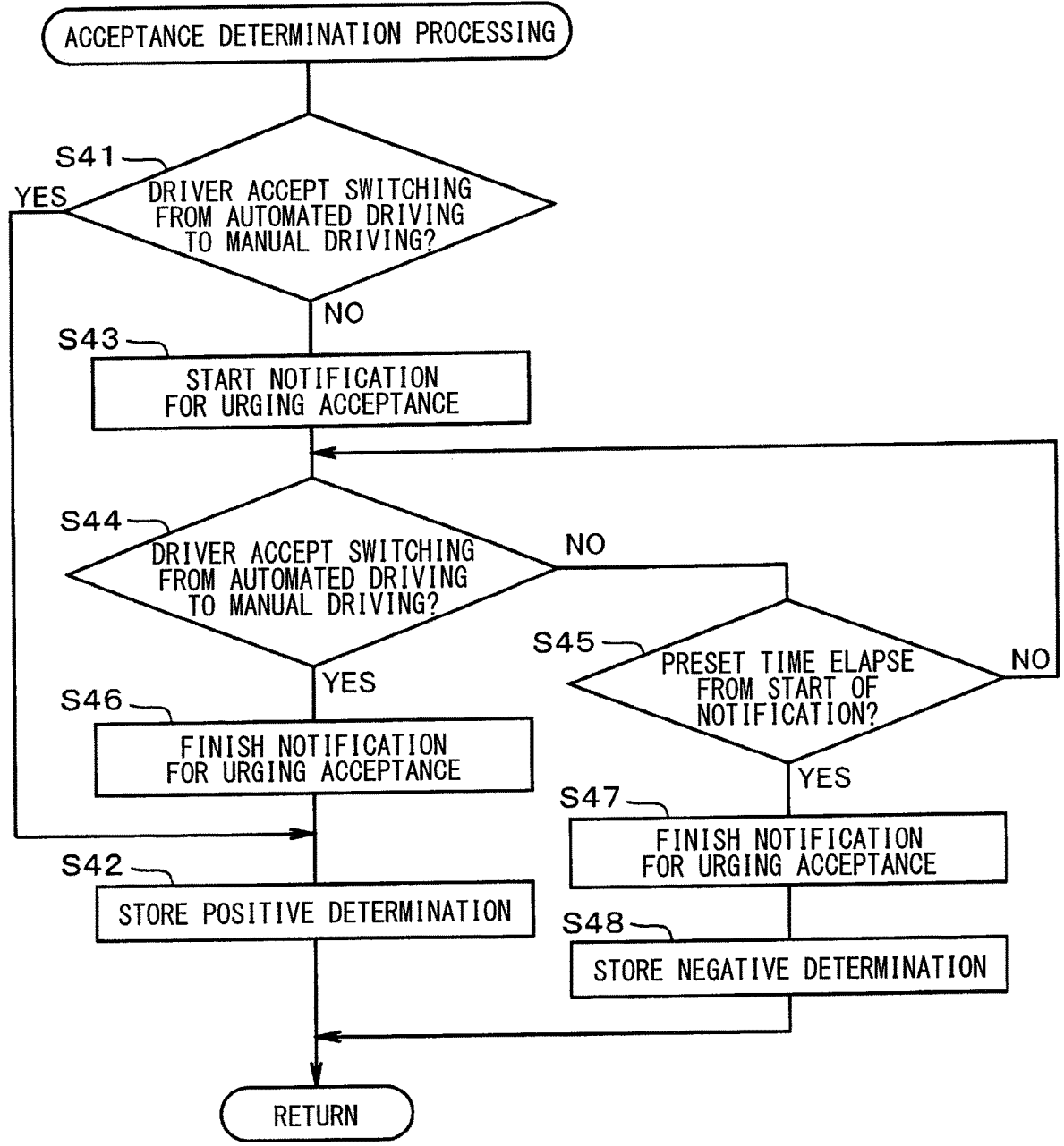
FIG. 5 is a flowchart showing an acceptance determination processing.
Figure 6:
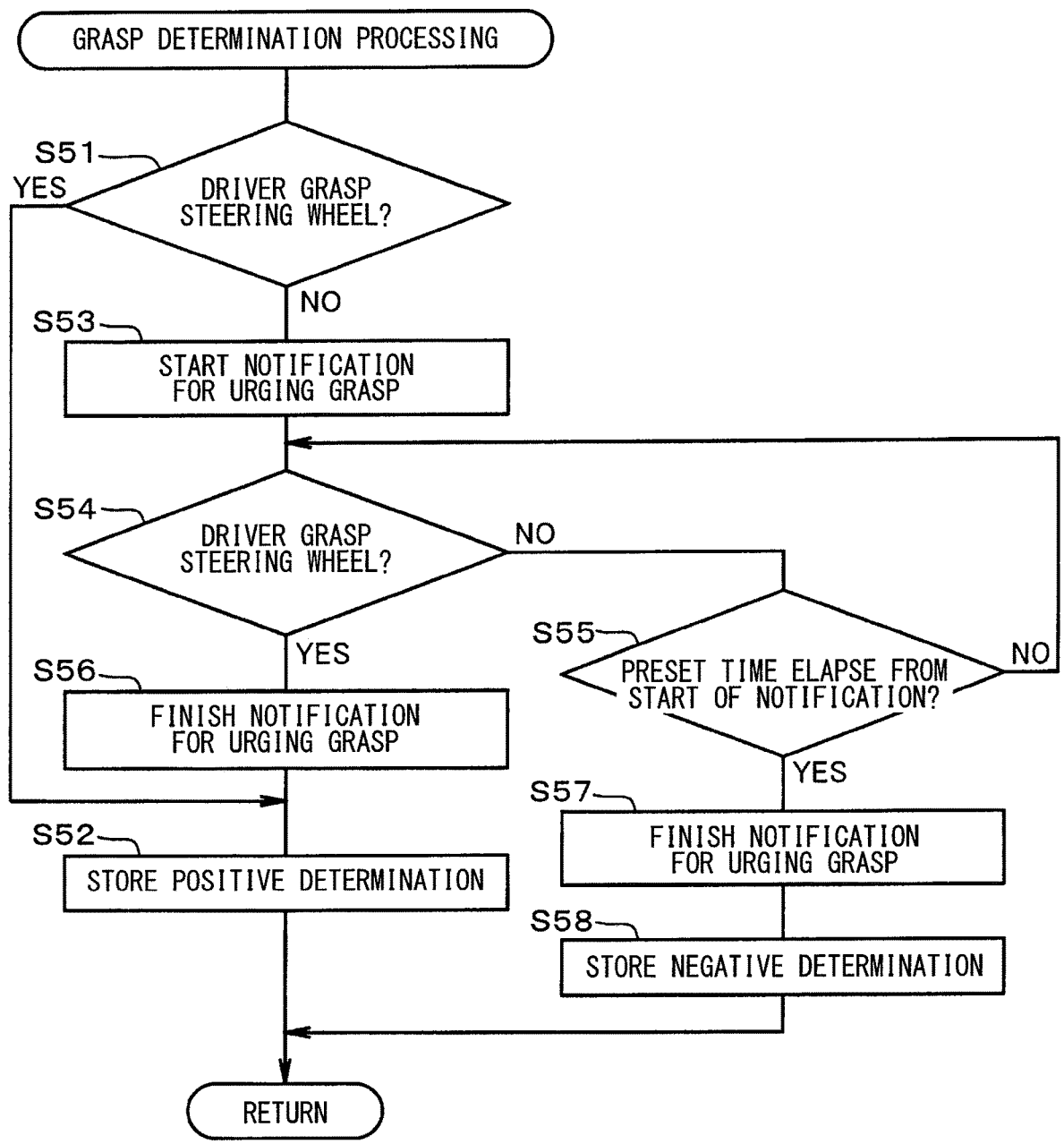
FIG. 6 is a flowchart showing a grasp determination processing.

An automated driving system for automated driving of a vehicle is provided. A navigation device searches a route again and extends an originally planned automated driving section when a switch from the automated driving to manual driving is determined to be impossible. In this technique, the automated driving continues to be executed and the switch from the automated driving to the manual driving is postponed.

The inventor has studied that, in a technique for determining whether a switch from the automated driving to the manual driving is possible, multiple determination items, such as whether the driver is seated on the driver seat, whether the driver is awake, and the like are determined when the vehicle passes through a predetermined switch determination point. In this case, when determining that, for example, the driver is seated on the driver seat and the driver is awake (that is, all determination items are positive), an automatic driving system switches from the automated driving to the manual driving. On the other hand, when not determining that the driver is seated on the driver seat and the driver is awake (that is, at least one of determination items is negative), the automatic driving system urges the driver to sit on the driver seat or to awake by the display, sound output, or the like, and waits for the driver to sit on the driver seat or to awake for a certain period of time. When determining that the driver sits on the driver seat and awake before the certain period of time elapses, the automatic driving system switches from the automated driving to the manual driving. On the other hand, when not determining that the driver sits on the driver seat and awake before the certain period of time elapses, the automatic driving system causes the vehicle to automatically stop in a safe area.

In the configuration in which the determination items are determined at a first time when the vehicle passes through the switch determination point, there is a difficulty described below. When the determination result of each of the multiple determination items is positive, the switch from the automated driving to the manual driving can be performed in a relatively short time after the vehicle passes through the switch determination point. When the determination result of at least one of the multiple determination items is negative, the display, the sound output, or the like urges a reaction of the driver and the automatic driving system waits for a certain period of time. In this configuration, the switch from the automatic driving to the manual driving cannot be performed even after the vehicle passes through the switch determination point, then the automated driving may be continued unnecessarily. Especially when the automated driving is executed on a rode for the exclusive use for vehicles, a switch determination point is set in front of an exit interchange which is the closest to the destination. When the switch from the automated driving to the manual driving is not capable of being executed, the automated driving is unnecessarily continued from the exit interchange to the next interchange. As a result, the configuration causes the driver to take a detour and results in a great disadvantage.

The present disclosure provides an automated driving system and an automated driving switch determination program product capable of appropriately switching from automated driving to manual driving when a vehicle passes through a predetermined switch determination point or after a vehicle passes through a predetermined switch determination point.

According to an aspect of the present disclosure, an automated driving system includes a determiner, a driving switch controller, and a notification controller. The determiner determines each of a plurality of determination items that is a condition for switching from an automated driving to a manual driving. The driving switch controller switches from the automated driving to the manual driving when all of the plurality of determination items are determined as positive. The notification controller notifies a driver of notification information for urging a reaction of the driver when at least one of the plurality of determination items is determined as negative. The determiner determines the at least one or all of the plurality of determination items at a time point before a vehicle passes through a switch determination point. The determiner determines the at least one or all of the plurality of determination items at a time point when the vehicle passes through the switch determination point or at a time point after the vehicle passes through the switch determination point.

The inventor has studied that the multiple determination items are determined at a first time when the vehicle passes through the switch determination point. In the automated driving system of the present disclosure, at least one or all of the multiple determination items are also determined before the vehicle passes through the switch determination point. The configuration can determine at least one or all of the multiple determination items when there is a margin for the time at which the vehicle passes through the switch determination point. When the determination result of at least one of the determination items, which was determined before the vehicle passes through the switch determination point, is negative, the configuration can notify the driver of the notification information for urging the driver's reaction. Thus, the configuration can sufficiently secure a period of time for switching the determination result from negative to positive. As a result, there is a high possibility that all of the determination results are positive when the vehicle passes through the switch determination point. Thus, the configuration can appropriately switch the automatic driving system from the automated driving to the manual driving when the vehicle passes through the switch determination point or after the vehicle passes through the switch determination point.

Hereinafter, an embodiment will be described with reference to the drawings. An automated driving system 1 includes a navigation device 2, a locator device 3, and a traveling track management device 4.

The navigation device 2 executes reception processing for GPS radio waves radiated from a GPS satellite and received by a GPS in-dash antenna 5. The navigation device 2 has a function of specifying a current position of a vehicle as a vehicle position by calculating various types of parameters extracted from the GPS radio waves. The navigation device 2 transmits various pieces of navigation information to the locator device 3. The navigation information includes the vehicle position, a destination, a route from the vehicle position to the destination, an estimated arrival time, or the like. The navigation device 2 transmits a display command signal or a sound output command signal to a HMI device 6.

The HMI device 6 is provided by a head-up display, a speaker, or the like. When receiving the display command signal from the navigation device 2, the HMI device 6 shows display information such as a warning, a route guidance, or the like on the head-up display in response to the display command signal. When receiving the sound output command signal from the navigation device 2, the HMI device 6 outputs sound information such as the warning, the route guidance, or the like from the speaker in response to the sound output command signal.

The locator device 3 includes a controller 7, a GPS receiver 8, a gyro sensor 9, a G sensor 10, a road network data storage 11, and a detailed map data storage 12. The GPS receiver 8 executes reception processing for the GPS radio waves radiated from the GPS satellite and received by a GPS roof antenna 13. The GPS receiver 8 specifies the current position of the vehicle as the vehicle position by calculating the various types of parameters extracted from the GPS radio waves. The GPS receiver 8 transmits a position signal indicative of the specified vehicle position to the controller 7. The gyro sensor 9 detects an angular velocity acting on the vehicle, and transmits an angular velocity signal indicative of the detected angular velocity to the controller 7. The G sensor 10 detects acceleration acting on the vehicle, and transmits an acceleration signal indicative of the detected acceleration to the controller 7. The road network data storage 11 stores road network data, and transmits the road network data to the controller 7. The detailed map data storage 12 stores detailed map data, and transmits the detailed map data to the controller 7. The road network data stored in the road network data storage 11 and the detailed map data stored in the detailed map data storage 12 are more accurate than the map data employed when the navigation device 2 specifies the vehicle position.

The controller 7 corrects the vehicle position, which is indicated by the position signal received from the GPS receiver 8, by the angular velocity, which is indicated by the angular velocity signal received from the gyro sensor 9, or the acceleration, which is indicated by the acceleration signal received from the G sensor 10. Further, as described above, the use of the road network data or the detailed map data enables to more accurately specify the vehicle position than the use of the map data of the navigation device 2. Thus, the controller 7 corrects the vehicle position specified by the navigation device 2 together with the road network data or the detailed map data.

A driver camera 15 photographs a driver seated on the driver seat and transmits an image signal including the photographed image to a driver state detection device 14. The driver camera 15 may be provided by a CCD (i.e., Charge Coupled Device) image sensor, a CMOS (i.e., Complementary Metal Oxide Semiconductor) image sensor, or the like, and may include a single camera or multiple cameras. A seat sensor 16 transmits a seat sensor signal indicative of pressure acting on the driver seat to the driver state detection device 14. The microphone 17 transmits a collected sound signal indicative of collected sound to the driver state detection device 14. A steering wheel sensor 18 transmits a steering wheel sensor signal indicative of pressure acting on a steering wheel to the driver state detection device 14.

The driver state detection device 14 detects a driver state using the image signal received from the driver camera 15, the seat sensor signal received from the seat sensor 16, the collected sound signal received from the microphone 17, or the steering wheel sensor signal received from the steering wheel sensor 18. Specifically, the driver state detection device 14 may determine the image in which the driver is seated on the driver seat using the image signal or the pressure exceeding a constant value acting on the driver seat using the seat sensor signal. With this configuration, the driver state detection device 14 determines that the driver is seated on the driver seat. The driver state detection device 14 may determine the image in which the driver's eye opens using the image signal or the sound uttered by the driver using the collected sound signal. With this configuration, the driver state detection device 14 determines that the driver is awake. The driver state detection device 14 may determine that the driver utters a voice for accepting the switch from the automated driving to the manual driving using the collected sound signal. With this configuration, the driver state detection device 14 determines that the driver accepts the switch from the automated driving to the manual driving. The driver state detection device 14 may determine the pressure exceeding the constant value acting on the steering wheel using the steering wheel sensor signal. With this configuration, the driver state detection device 14 determines that the driver grips the steering wheel. The driver state detection device 14 determines whether the driver is seated on the driver seat, the driver is awake, the driver accepts the switch from the automated driving to the manual driving, and the driver grasps the steering wheel. With this configuration, the driver state detection device 14 transmits a detection signal indicative of the detection result to the navigation device 2, the locator device 3, and the traveling track management device 4.

A steering angle sensor 19 detects a steering angle of the steering wheel, and transmits a steering angle signal indicative of the detected steering angle of the steering wheel to the traveling track management device 4. An accelerator sensor 20 detects an operation amount of accelerator, and transmits an accelerator signal indicative of the detected operation amount of accelerator to the traveling track management device 4. A brake sensor 21 detects an operation amount of brake, and transmits a brake signal indicative of the detected operation amount of brake to the traveling track management device 4.

A vehicle front camera 22 captures an image in front of the vehicle, and transmits an image signal including the captured image to the traveling track management device 4. The vehicle front camera may be provided by the CCD image sensor, the CMOS image sensor, or the like, and may include a single camera or multiple cameras. A millimeter wave radar 23 transmits millimeter waves to the front of the vehicle, detects the presence of an object (for example, a preceding vehicle) in front of the vehicle based on the reception state of the reflected wave, and transmits a detection signal indicative of the detection result to the traveling track management device 4. A laser radar 24 transmits laser light to the front of the vehicle, detects the presence of the object in front of the vehicle based on the reception state of the reflected wave, and transmits a detection signal indicative of the detection result to the traveling track management device 4. Each of the millimeter wave radar and the laser radar may include a single radar or multiple radars.

The traveling track management device 4 identifies the traveling track on which the vehicle travels using the steering angle signal received from the steering angle sensor 19, the accelerator signal received from the accelerator sensor 20, the brake signal received from the brake sensor 21, the image signal received from the vehicle front camera 22, the detection signal received from the millimeter wave radar 23, and the detection signal received from the laser radar 24. When receiving an automated driving switch signal transmitted from the locator device 3, the traveling track management device 4 transmits traveling track information indicative of the identified traveling track to a vehicle motion control device 25. With this configuration, the traveling track management device 4 causes the automated driving system 1 to switch from the manual driving to the automated driving. When receiving a manual driving switch signal transmitted from the locator device 3, the traveling track management device 4 causes the automated driving system 1 to switch from the automated driving to the manual driving. When receiving an automated stop signal transmitted from the locator device 3, the traveling track management device 4 transmits automated stop information to the vehicle motion control device 25. With this configuration, the traveling track management device 4 causes the vehicle to automatically stop in a safe area.

When receiving the traveling track information transmitted from the traveling track management device 4, the vehicle motion control device 25 controls the vehicle to travel based on the traveling track indicated by the traveling track information. When receiving the automated stop information transmitted from the traveling track management device 4, the vehicle motion control device 25 controls the vehicle to automatically stop in the safe area.

In the locator device 3, a controller 7 is provided by a microcomputer having a CPU (i.e., Central Processing Unit), a ROM (i.e., Read Only Memory), a RAM (i.e., Random Access Memory), and an I/O device (i.e., Input/Output device). The controller 7 executes a computer program stored in a non-transitory tangible storage medium to execute a process corresponding to the computer program, and controls the overall operation of the locator device 3.

The controller 7 includes a determiner 7a, a driving switch controller 7b, an automated stop controller 7c, and a notification controller 7d. Each of the determiner 7a, the driving switch controller 7b, and the automated stop controller 7c is provided by an automated driving switch determination program executed by the controller 7, and is achieved by software.

The determiner 7a determines each of multiple determination items that is a condition for switching from the automated driving to the manual driving. Specifically, the determiner 7a determines a determination item whether the driver is seated on the driver seat, a determination item whether the driver is awake, a determination item whether the driver accepts the switch from the automated driving to the manual driving, and a determination item whether the driver grasps the steering wheel. When the automated driving system 1 is in the automated driving state and all of the multiple determination items are determined as positive, the driving switch controller 7b transmits the manual driving switch signal to the traveling track management device 4 and causes the automated driving system 1 to switch from the automated driving to the manual driving. When the automated driving system 1 is in the automated driving state and at least one of the multiple determination items is determined as negative, the automated stop controller 7c transmits the automated stop signal to the traveling track management device 4 and causes the vehicle to automatically stop in the safe area. The notification controller 7d transmits a notification instruction signal to the HMI device 6 through the navigation device 2, and causes the HMI device 6 to notify the driver of the display that urges a driver's reaction or information of the sound output or the like. Specifically, the notification controller 7d causes the head-up display to display or causes the speaker to output the information that urges the seating on the driver seat, the awakening, the acceptance of the switch from the automated driving to the manual driving, or the grasp of the steering wheel.

Next, the process of the above configuration will be described with reference to FIGS. 2 to 12. The controller 7 executes automated driving switch determination processing. When switching from the manual driving to the automated driving, the controller 7 starts the automated driving switch determination processing which determines the switch from the automated driving to the manual driving (that is, return to the manual driving). On a rode for the exclusive use for vehicles, a section from an interchange to another interchange is defined as an automated driving section. A case where the automated driving system 1 executes the automated driving and a switch determination point is set in front of an exit interchange which is the closest to the destination will be described.

When starting the automated driving switch determination processing, the controller 7 determines whether the vehicle has passed through a first predetermined point (S1). The first predetermined point is defined that a remaining distance from the switch determination point is a first predetermined distance (for example, the distance which is about 20 kilometers away from a branch point of the exit interchange). When the controller 7 determines that the vehicle has passed through the first predetermined point based on the navigation information received from the navigation device 2 or the vehicle position specified by the controller 7 (S1:YES), the procedure proceeds to the seating determination processing (S2, corresponding to a first determination processing).

When starting the seating determination processing, the controller 7 determines whether the driver is seated on the driver seat using the detection signal received from the driver state detection device 14 (S21). When the controller 7 determines that the driver is seated on the driver seat (S21:YES), the controller 7 stores information that the determination result is positive (S22), and ends the seating determination processing. On the other hand, when not determining that the driver is seated on the driver seat (S21:NO), the controller 7 transmits the notification instruction signal to the HMI device 6 through the navigation device 2 and starts the notification that urges the driver to sit on the driver seat (S23, corresponding to the notification control processing).

When starting the notification that urges the driver to sit on the driver seat, the controller 7 determines whether the driver is seated on the driver seat (S24) and whether a preset time (for example, a few seconds) has elapsed since the notification started (S25). When determining that the driver is seated on the driver seat before the preset time elapses (S24:YES), the controller 7 finishes the notification that urges the driver to sit on the driver seat (S26), stores information that the determination result is positive (S22), and ends the seating determination processing. On the other hand, when the controller 7 determines that the driver is not seated on the driver seat and the preset time elapses (S25: YES), the controller 7 ends the notification that urges the driver to sit on the driver seat (S27), stores information that the determination result is negative (S28), and ends the seating determination processing. When the driver does not sit on the driver seat, the controller 7 continues the notification that urges the driver to sit on the driver seat until the preset time elapses.

When returning the automated driving switch determination processing after the seating determination processing ends, the controller 7 determines whether the vehicle has passed through a second predetermined point (S3). The second predetermined point is defined that a remaining distance from the switch determination point is a second predetermined distance (for example, the distance which is about 15 kilometers away from a branch point of the exit interchange). When the controller 7 determines that the vehicle has passed through the second predetermined point based on the navigation information received from the navigation device 2 or the vehicle position specified by the controller 7 (S3:YES), the procedure proceeds to the seating determination processing and awakening determination processing (S4, corresponding to the first determination processing).

The controller 7 executes the seating determination processing and the awakening determination processing in parallel. The controller 7 executes the seating determination processing in accordance with S21 to S28. When starting the awakening determination processing, the controller 7 determines whether the driver is awake using the detection signal received from the driver state detection device 14 (S31). When determining that the driver is awake (S31:YES), the controller 7 stores information that the determination result is positive (S32), and ends the awakening determination processing. On the other hand, when not determining that the driver is awake (S31: NO), the controller 7 transmits the notification instruction signal to the HMI device 6 through the navigation device 2 and starts the notification that urges the driver to awake (S33, corresponding to the notification control processing).

When starting the notification that urges the driver to awake, the controller 7 determines whether the driver is awake (S34) and whether a preset time (for example, a few seconds) has elapsed since the notification started (S35). When determining that the driver is awake before the preset time elapses (S34:YES), the controller 7 finishes the notification that urges the driver to awake (S36), stores information that the determination result is positive (S32), and ends the awakening determination processing. On the other hand, when the controller 7 determines that the driver is not awake and the preset time elapses (S35:YES), the controller 7 ends the notification that urges the driver to awake (S37), stores information that the determination result is negative (S38), and ends the awakening determination processing. When the driver does not awake, the controller 7 continues the notification that urges the driver to awake until the preset time elapses.

When returning the automated driving switch determination processing after the seating determination processing and the awakening determination processing ends, the controller 7 determines whether the vehicle has passed through a third predetermined point (S5). The third predetermined point is defined that a remaining distance from the switch determination point is a third predetermined distance (for example, the distance which is about 1 kilometer away from the branch point of the exit interchange). When the controller 7 determines that the vehicle has passed through the third predetermined point based on the navigation information received from the navigation device 2 or the vehicle position specified by the controller 7 (S5:YES), the procedure proceeds to the seating determination processing, the awakening determination processing, and acceptance determination processing (S6, corresponding to the first determination processing).

The controller 7 executes the seating determination processing, the awakening determination processing, and the acceptance determination processing in parallel. The controller 7 executes the seating determination processing in accordance with S21 to S28. The controller 7 executes the awakening determination processing in accordance with S31 to S38. When starting the acceptance determination processing, the controller 7 determines whether the driver accepts the switch from the automated driving to the manual driving using the detection signal received from the driver state detection device 14 (S41). When the controller 7 determines that the driver accepts the switch from the automated driving to the manual driving (S41:YES), the controller 7 stores information that the determination result is positive (S42), and ends the acceptance determination processing. On the other hand, when not determining that the driver accepts the switch from the automated driving to the manual driving (S41: NO), the controller 7 transmits the notification instruction signal to the HMI device 6 through the navigation device 2 and starts the notification that urges the acceptance (S43, corresponding to the notification control processing).

When starting the notification that urges the acceptance, the controller 7 determines whether the driver accepts the switch (S44) and whether a preset time (for example, a few seconds) has elapsed since the notification started (S45). When determining that the driver accepts the switch before the preset time elapses (S44:YES), the controller 7 finishes the notification that urges the acceptance (S46), stores information that the determination result is positive (S42), and ends the acceptance determination processing. On the other hand, when the controller 7 determines that the driver does not accept the switch and the preset time elapses (S45:YES), the controller 7 ends the notification that urges the acceptance (S47), stores information that the determination result is negative (S48), and ends the acceptance determination processing. When the driver does not accept the switch, the controller 7 continues the notification that urges the acceptance until the preset time elapses.

When returning the automated driving switch determination processing after the seating determination processing, the awakening determination processing, and the acceptance determination processing ends, the controller 7 determines whether the vehicle has passed through the switch determination point (for example, the distance which is about 500 meters away from the branch point of the exit interchange) (S7). When the controller 7 determines that the vehicle has passed through the switch determination point based on the navigation information received from the navigation device 2 or the vehicle position specified by the controller 7 (S7:YES), the procedure proceeds to the seating determination processing, the awakening determination processing, the acceptance determination processing, and grasp determination processing (S8, corresponding to second determination processing).

The controller 7 executes the seating determination processing in accordance with S21 to S28. The controller 7 executes the awakening determination processing in accordance with S31 to S38. The controller 7 executes the acceptance determination processing in accordance with S41 to S48. When starting the grasp determination processing, the controller 7 determines whether the driver grasps the steering wheel using the detection signal received from the driver state detection device 14 (S51). When determining that the driver grasps the steering wheel (S51:YES), the controller 7 stores information that the determination result is positive (S52), and ends the grasp determination processing. On the other hand, when not determining that the driver grasps the steering wheel (S51: NO), the controller 7 transmits the notification instruction signal to the HMI device 6 through the navigation device 2 and starts the notification that urges the driver to grasp the steering wheel (S53, corresponding to the notification control processing).

When starting the notification that urges the driver to grasp the steering wheel, the controller 7 determines whether the driver grasps the steering wheel (S54) and whether a preset time (for example, a few seconds) has elapsed since the notification started (S55). When determining that the driver grasps the steering wheel before the preset time elapses (S54:YES), the controller 7 finishes the notification that urges the driver to grasp the steering wheel (S56), stores information that the determination result is positive (S52), and ends the grasp determination processing. On the other hand, when the controller 7 determines that the driver does not grasp the steering wheel and the preset time elapses (S55:YES), the controller 7 ends the notification that urges the driver to grasp the steering wheel (S57), stores information that the determination result is negative (S58), and ends the grasp determination processing. When the driver does not grasp the steering wheel, the controller 7 continues the notification that urges the driver to grasp the steering wheel until the preset time elapses.

When the controller 7 ends the seating determination processing, the awakening determination processing, the acceptance determination processing, and the grasp determination processing and the procedure returns to the automated driving switch processing, the controller 7 determines whether all the determination results are positive (S9). When determining that all the determination results are positive (S9:YES), the controller 7 transmits the manual driving switch signal to the traveling track management device 4 and causes the automated driving system 1 to switch from the automated driving to the manual driving (S10, corresponding to driving switch control processing). On the other hand, the controller 7 determines that not all the determination results are positive, that is, at least one of the determination results is negative (S9:NO), the controller 7 causes the vehicle to automatically stops in the safe area (S11, corresponding to automatic stop control processing).

Figure 7:
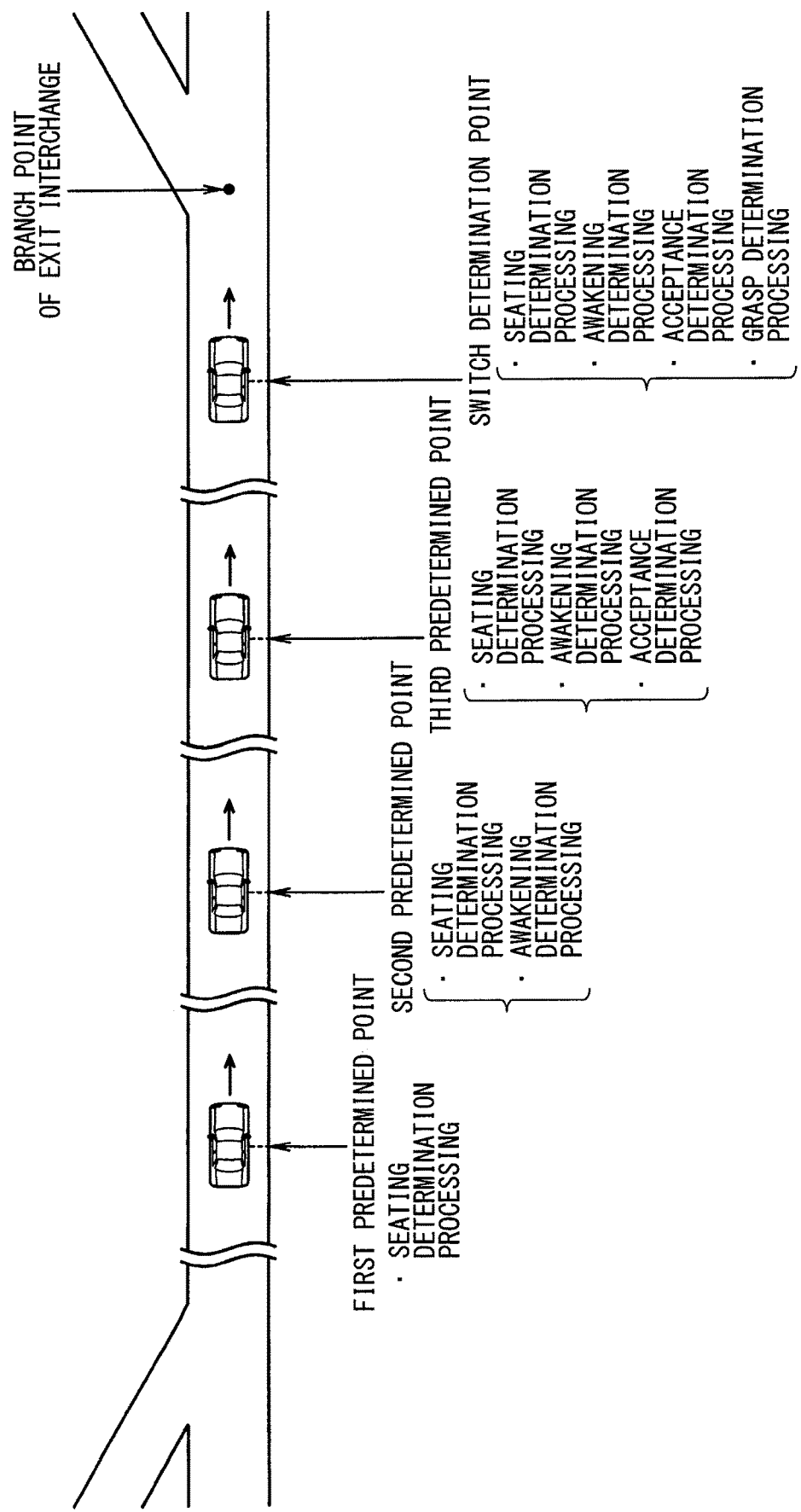
FIG. 7 is a first diagram showing a time point for executing each of determination processing items.

By executing the above-described processing, as shown in FIG. 7, when the vehicle passes through the first predetermined point, the controller 7 executes the seating determination processing, when the vehicle passes through the second predetermined point, the controller 7 executes the seating determination processing and the awakening determination processing, when the vehicle passes through the third predetermined point, the controller 7 executes the seating determination processing, the awakening determination processing, and the acceptance determination processing, and when the vehicle passes through the switch determination point, the controller 7 executes the seating determination processing, the awakening determination processing, the acceptance determination processing, and grasp determination processing. That is, a part of the multiple determination items is determined before the vehicle passes through the switch determination point. The configuration can determine the determination items when there is a margin for the time at which the vehicle passes through the switch determination point. When the determination result of at least one of the determination items, which was determined before the vehicle passes through the switch determination point, is negative, the configuration can urge the driver's reaction. Thus, the configuration can sufficiently secure a period of time for switching the determination result from negative to positive. As a result, there is a high possibility that all of the determination results are positive when the vehicle passes through the switch determination point. Thus, the configuration can appropriately switch the automatic driving system 1 from the automated driving to the manual driving when the vehicle passes through the switch determination point. The configuration can avoid a situation in which the automated driving is unnecessarily continued from the exit interchange to the next interchange without switching from the automated driving to the manual driving.

Figure 8:
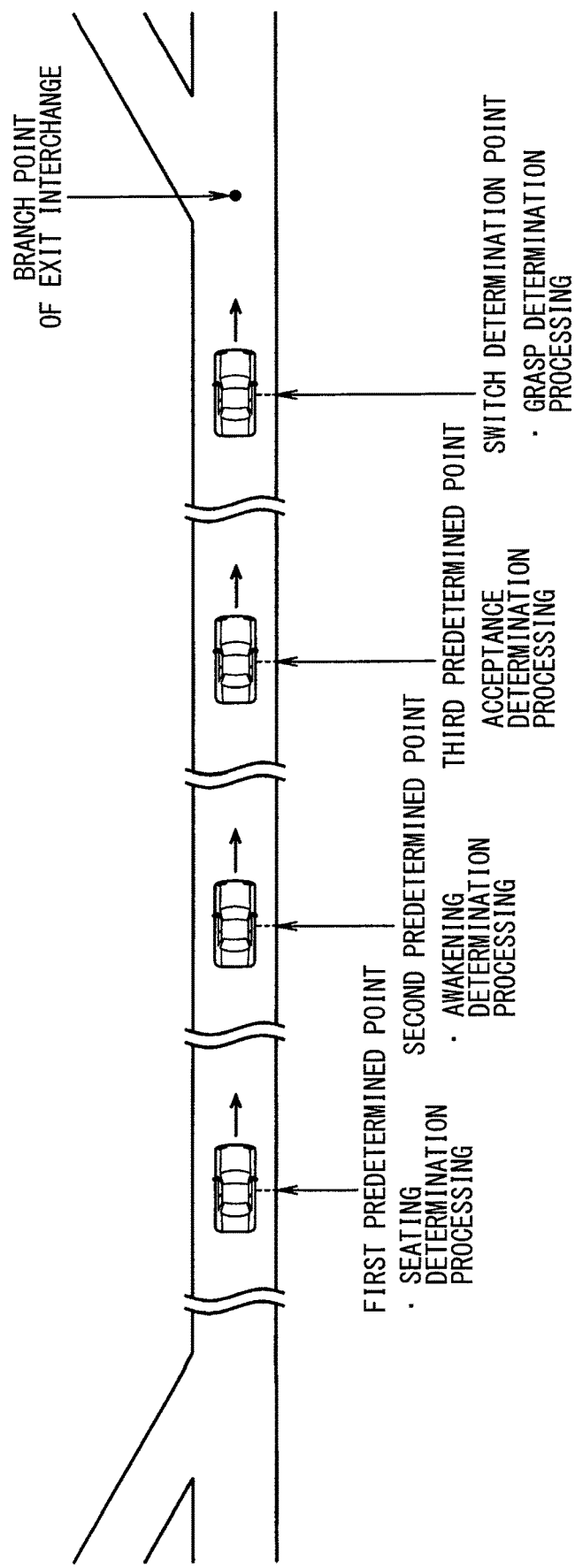
FIG. 8 is a second diagram showing a time point for executing each of the determination processing items.

Alternatively, as shown in FIG. 8, when the vehicle passes through the first predetermined point, the controller 7 executes the seating determination processing, when the vehicle passes through the second predetermined point, the controller 7 executes the awakening determination processing, when the vehicle passes through the third predetermined point, the controller 7 executes the acceptance determination processing, and when the vehicle passes through the switch determination point, the controller 7 executes the grasp determination processing. In this case, a part of the multiple determination items is determined before the vehicle passes through the switch determination point. Thus, the configuration can determine the determination items when there is a margin for the time at which the vehicle passes through the switch determination point.

Figure 9:
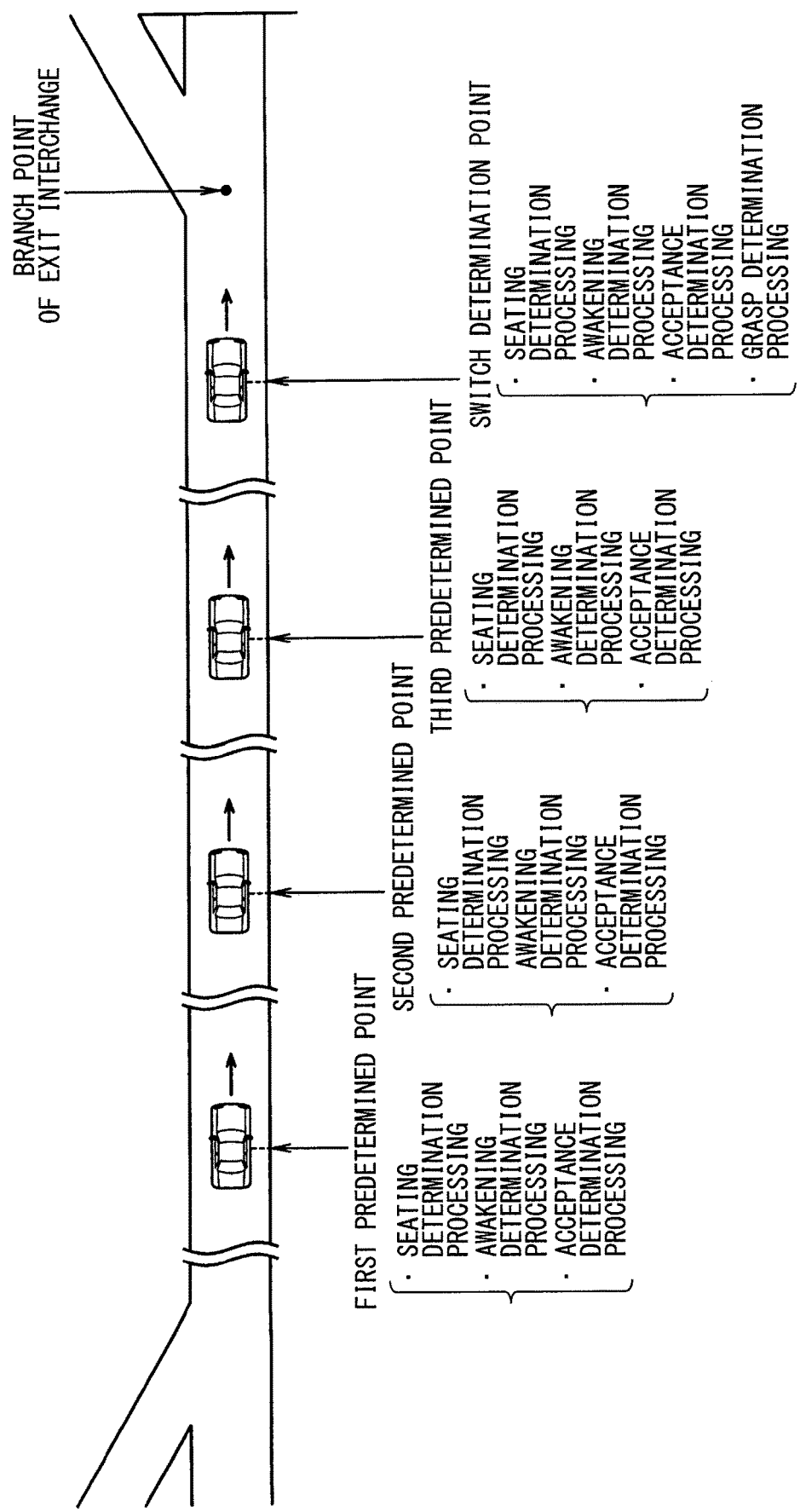
FIG. 9 is a third diagram showing a time point for executing each of the determination processing items.

Alternatively, as shown in FIG. 9, when the vehicle passes through each of the first predetermined point, the second predetermined point, and the third predetermined point, the controller 7 executes the seating determination processing, the awakening determination processing, and the acceptance determination processing, and when the vehicle passes through the switch determination point, the controller 7 executes the seating determination processing, the awakening determination processing, the acceptance determination processing, and the grasp determination processing. That is, the controller 7 executes all the determination processing items except for the grasp determination processing, which is the most important determination processing, before the vehicle passes through the switch determination point. When the vehicle passes through the switch determination point, the controller 7 executes the grasp determination processing in addition to the other processing items. In this case, a part of the multiple determination items is determined before the vehicle passes through the switch determination point. Thus, the configuration can determine the determination items when there is a margin for the time at which the vehicle passes through the switch determination point.

Figure 10:
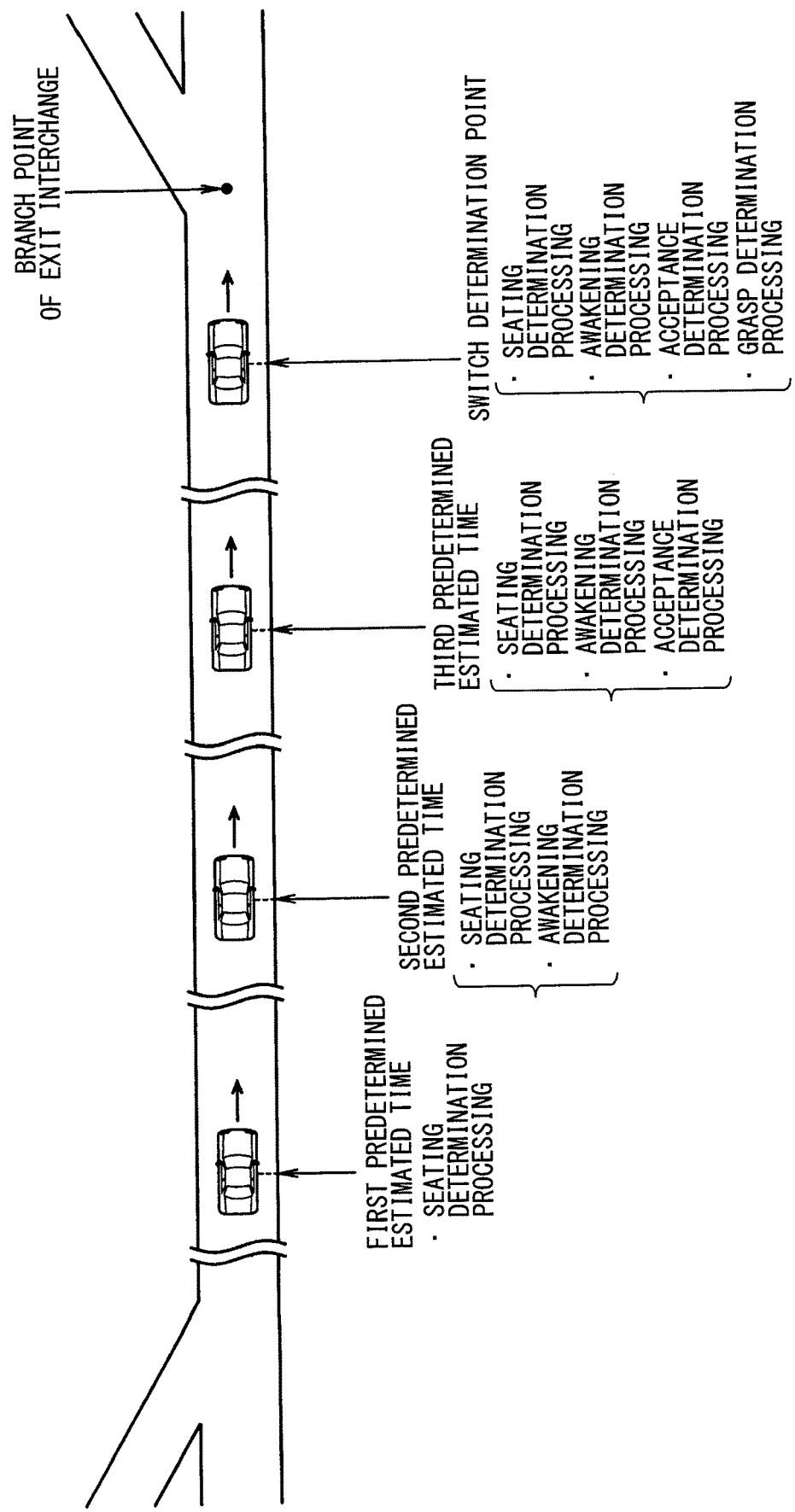
FIG. 10 is a fourth diagram showing a time point for executing each of the determination processing items.

Alternatively, in the controller 7, for the time points before the vehicle passes through the switch determination point, an estimated time for the vehicle to arrive at the switch determination point may be employed as a reference instead of the distance from the vehicle position to the switch determination point as the reference. That is, as shown in FIG. 10, the controller 7 executes the seating determination processing when the remaining estimated time becomes a first predetermined estimated time (for example, 20 minutes). The controller 7 executes the seating determination processing and the awakening determination processing when the remaining estimated time becomes a second predetermined estimated time (for example, 10 minutes). The controller 7 executes the seating determination processing, the awakening determination processing, and the acceptance determination processing when the remaining estimated time becomes a third predetermined estimated time (for example, 2 minutes).

Figure 11:
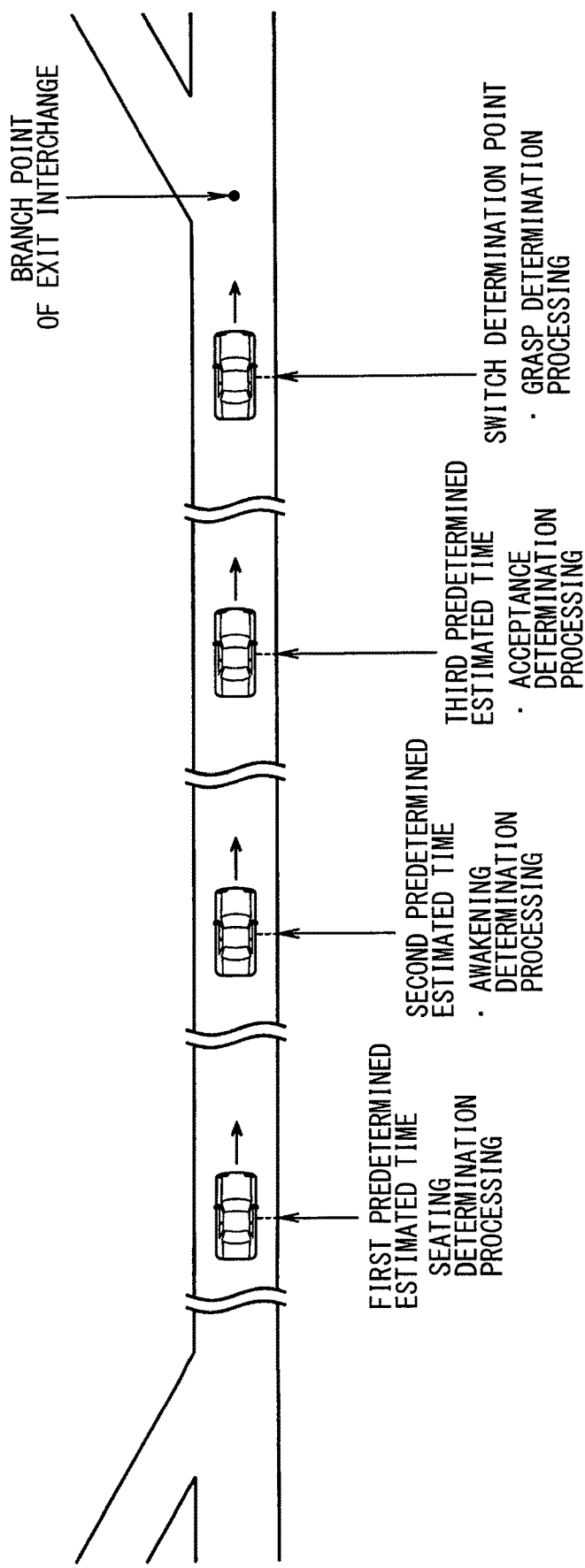
FIG. 11 is a fifth diagram showing a time point for executing each of the determination processing items.
Figure 12:
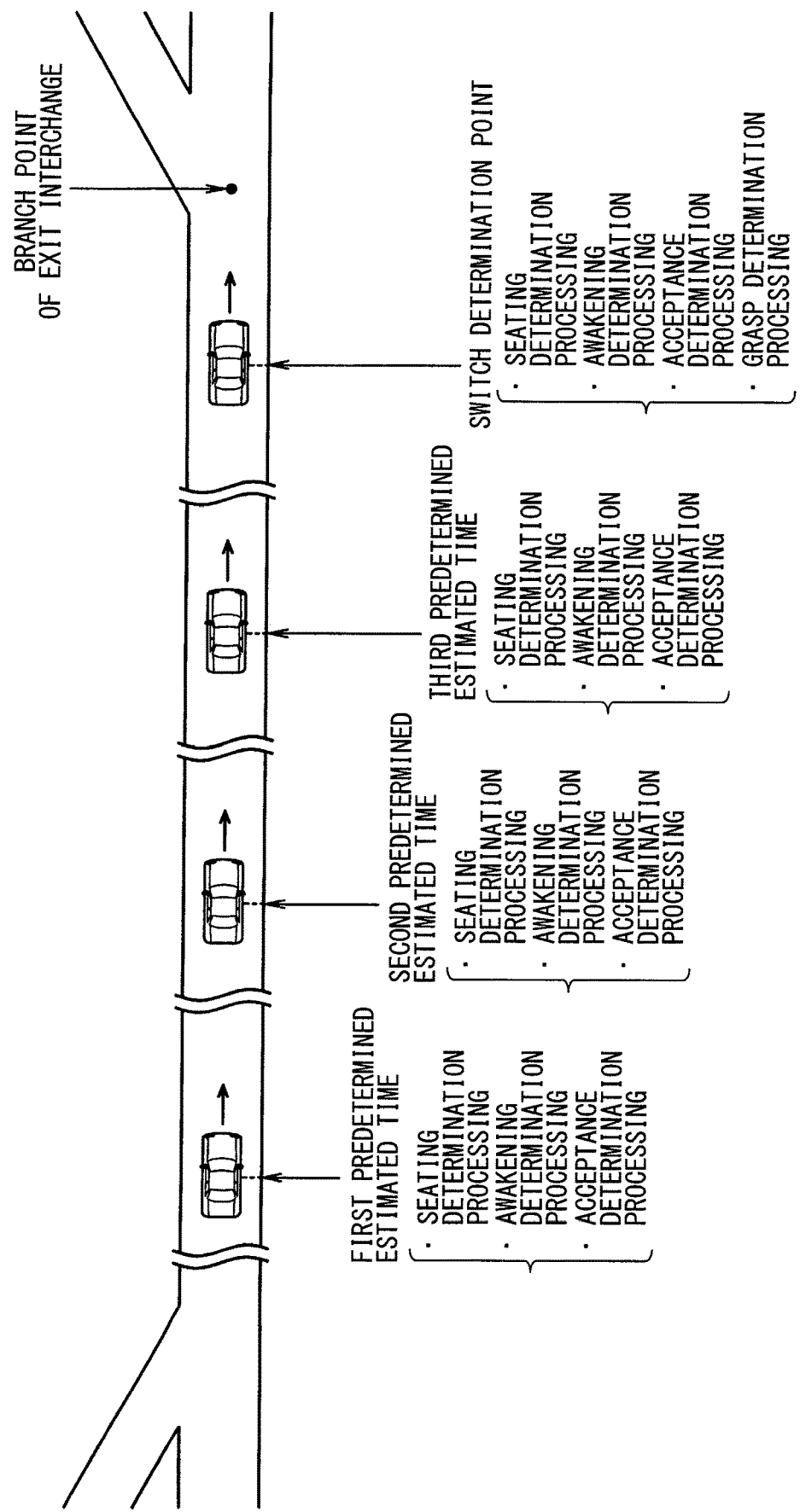
FIG. 12 is a sixth diagram showing a time point for executing each of the determination processing items.

Alternatively, as shown in FIG. 11, the controller 7 executes the seating determination processing when the remaining estimated time becomes the first predetermined estimated time. The controller 7 executes the awakening determination processing when the remaining estimated time becomes the second predetermined estimated time. The controller 7 executes the acceptance determination processing when the remaining estimated time becomes the third predetermined estimated time. Alternatively, as shown in FIG. 12, when the remaining estimated time becomes each of the first predetermined estimated time, the second predetermined estimated time and the third predetermined estimated time, the controller 7 executes the seating determination processing, the awakening determination processing, and the acceptance determination processing. When employing the remaining estimated time as the reference, the controller 7 updates the remaining estimated time as needed using various pieces of information, for example, traffic congestion, speed regulation, lane regulation or the like by VICS (Vehicle Information and Communication System, registered trademark).

The configuration described in the present embodiment can provide advantages below.

In the automated driving system 1, a part or all of the multiple determination items, which are conditions for switching from the automated driving to the manual driving, are determined before the vehicle passes through the switch determination point. Thus, the configuration can determine a part or all of the multiple determination items when there is a margin for the time at which the vehicle passes through the switch determination point. When the determination result of at least one of the determination items, which was determined before the vehicle passes through the switch determination point, is negative, the configuration can urge the driver's reaction. Thus, the configuration can sufficiently secure a period of time for switching the determination result from negative to positive. As a result, there is a high possibility that all of the determination results are positive when the vehicle passes through the switch determination point. Thus, the configuration can appropriately switch the automatic driving system 1 from the automated driving to the manual driving when the vehicle passes through the switch determination point.

In addition, in the automated driving system 1, a part or all of the multiple determination items are determined when the remaining distance from the vehicle position to the switch determination point reaches the predetermined distance. The configuration can stepwise determine the multiple determination items by defining the remaining distance from the vehicle position to the switch determination point as the reference.

In the automated driving system 1, a part or all of the multiple determination items are determined when the remaining estimated time in which the vehicle arrives at the switch determination point becomes the predetermined estimated time. The configuration can stepwise determine the multiple determination items by defining the remaining estimated time in which the vehicle arrives at the switch determination point as the reference.

The automated driving system 1 determines, as the multiple determination items, the determination item whether the driver is seated on the driver seat, the determination item whether the driver is awake, the determination item whether the driver accepts the switch from the automated driving to the manual driving, and the determination item whether the driver grasps the steering wheel. The configuration can control the automated driving system 1 to switch from the automated driving to the manual driving based on the whether the driver is seated on the driver seat, the driver is awake, the driver accepts the switch from the automated driving to the manual driving, and the driver grasps the steering wheel.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

Alternatively, in FIG. 7 or FIG. 9, the automated driving system 1 executes the seating determination processing, the awakening determination processing, the acceptance determination processing, and the grasp determination processing (that is, all determination processing) when the vehicle passes through each of the first predetermined point, the second predetermined point, and the third predetermined point, similarly to the switch determination point. Alternatively, in FIG. 10 or FIG. 12, the automated driving system 1 executes the seating determination processing, the awakening determination processing, the acceptance determination processing, and the grasp determination processing when the remaining estimated time becomes each of the first predetermined estimated time, the second predetermined estimated time, and the third predetermined estimated time, similarly to the time point at which the vehicle passes through the switch determination point.

The seating determination processing, the awakening determination processing, and the acceptance determination processing may be executed continuously. That is, in FIG. 7, the seating determination processing may be continuously executed at a predetermined cycle from the first predetermined point to the switch determination point. Similarly, the seating determination processing and the awakening determination processing may be continuously executed at a predetermined cycle from the second predetermined point to the switch determination point. The seating determination processing, the awakening determination processing, and the acceptance determination processing may be continuously executed at a predetermined cycle from the third predetermined point to the switch determination point.

The configuration is not limited to the case where the section from the interchange to the other interchange is defined as the automated driving section on the road for the exclusive use for the vehicles. The configuration may be applied to another section as the automated driving section.

The invention claimed is:

1. An automated driving system comprising:
a determiner configured to determine each of a plurality of determination items that is a condition for switching from automated driving of a subject vehicle to manual driving of the subject vehicle, the determiner configured to determine the plurality of determination items using one or more sensors, the one or more sensors including a driver camera;
a driving switch controller configured to switch from automated driving to manual driving of the subject vehicle when all of the plurality of determination items are determined as positive; and
a notification controller configured to, using an HMI device including a display and/or a speaker, notify a driver of the subject vehicle of notification information for urging a reaction from the driver when at least one of the plurality of determination items is determined as negative, wherein:
the determiner determines the at least one or all of the plurality of determination items at a time point before the subject vehicle passes through a switch determination point;
the determiner determines the at least one or all of the plurality of determination items and/or other of the plurality of determination items at a time point when the subject vehicle passes through the switch determination point or at a time point after the subject vehicle passes through the switch determination point;
in the determiner, the plurality of the determination items include a determination item whether the driver is seated on a driver seat, a determination item whether the driver is awake, a determination item whether the driver accepts a switch from automated driving to manual driving, and a determination item whether the driver grasps a steering wheel;
regardless of a result of the at least one or all of the plurality of determination items determined by the determiner at the time point before the subject vehicle passes through the switch determination point, the determiner determines the at least one or all of the plurality of determination items and/or the other of the plurality of determination items at the time point when or after the subject vehicle passes through the switch determination point; and
the driving switch controller is configured to switch from automated driving to manual driving on condition that results of determining that all of the plurality of determination items are positive after the determiner determines the at least one or all of the plurality of determination items and/or the other of the plurality of determination items at the time point when or after the subject vehicle passes through the switch determination point.

2. The automated driving system according to claim 1, wherein
the determiner determines at least two of the plurality of determination items in parallel at the time point before the subject vehicle passes through the switch determination point, and at the time point when the subject vehicle passes through the switch determination point or at the time point after the subject vehicle passes through the switch determination point.

3. The automated driving system according to claim 1, wherein,
in the determiner, the time point before the subject vehicle passes through the switch determination point is defined as a time point at which a remaining distance from a present vehicle position to the switch determination point reaches a predetermined distance.

4. The automated driving system according to claim 1, wherein,
in the determiner, the time point before the subject vehicle passes through the switch determination point is defined as a time point at which a remaining estimated time becomes a predetermined estimated time.

5. The automated driving system according to claim 1, wherein,
a plurality of time points, at which the determiner determines the at least one or all of the plurality of determination items, are set before the subject vehicle passes through the switch determination point.

6. The automated driving system according to claim 1, further comprising
an automated stop controller configured to automatically stop the subject vehicle in a safe area in a case where the at least one of the plurality of determination items is determined as negative at the time point when the subject vehicle passes through the switch determination point or at the time point after the subject vehicle passes through the switch determination point.

7. An automated driving switch determination program product stored in a non-transitory tangible computer readable storage medium, the automated driving switch determination program product comprising instructions executed by a controller of an automated driving system,
the instructions comprising:
determining at least one or all of a plurality of determination items, which are conditions for switching from automated driving of a subject vehicle to manual driving of the subject vehicle, before the subject vehicle passes through a switch determination point that is predetermined, the plurality of determination items determined using one or more sensors, the one or more sensors including a driver camera;
determining the at least one or all of the plurality of determination items and/or other of the plurality of determination items at a point in which the subject vehicle passes through the switch determination point or after the subject vehicle passes through the switch determination point;
notifying a driver of the subject vehicle of notification information for urging a reaction from the driver in response to the at least one of the plurality of determination items being determined as negative; and
switching from automated driving to manual driving in response to all of the plurality of determination items being determined as positive, wherein:
the plurality of the determination items include a determination item whether the driver is seated on a driver seat, a determination item whether the drive is awake, a determination item whether the driver accepts a switch from automated driving to manual driving, and a determination item whether the driver grasps a steering wheel; and
regardless of a result of the at least one or all of the plurality of determination items determined at a time point before the subject vehicle passes through the switch determination point, the instructions cause the at least one or all of the plurality of determination items and/or the other of the plurality of determination items to be determined at a time point when or after the subject vehicle passes through the switch determination point; and
the instructions further comprise:
switching from automated driving to manual driving on condition that results of determining all of the plurality of determination items are positive after determining the at least one or all of the plurality of determination items and/or the other of the plurality of determination items at the time point when or after the subject vehicle passes through the switch determination point.

8. The automated driving switch determination program product according to claim 7, further comprising an instruction for
automatically stopping the subject vehicle in a safe area in a case where the at least one of the plurality of determination items is determined as negative when the subject vehicle passes through the switch determination point or after the subject vehicle passes through the switch determination point.

9. A non-transitory computer readable storage medium that stores the automated driving switch determination program product according to claim 7.

10. An automated driving system comprising:
a computer, the computer is configured to
determine each of a plurality of determination items that is a condition for switching from automated driving of a subject vehicle to manual driving of the subject vehicle, the plurality of determination items being determined using one or more sensors, the one or more sensors including a driver camera;
switch from automated driving to manual driving when all of the plurality of determination items are determined as positive; and
notify a driver of the subject vehicle, using an HMI device including a display and/or a speaker, of notification information for urging a reaction from the driver when at least one of the plurality of determination items is determined as negative,
wherein:
the computer determines the at least one or all of the plurality of determination items at a time point before the subject vehicle passes through a switch determination point; and
the computer determines the at least one or all of the plurality of determination items and/or other of the plurality of determination items at a time point when the subject vehicle passes through the switch determination point or at a time point after the subject vehicle passes through the switch determination point,
the plurality of the determination items include a determination item whether the driver is seated on a driver seat, a determination item whether the driver is awake, a determination item whether the driver accepts a switch from automated driving to manual driving, and a determination item whether the driver grasps a steering wheel; and
regardless of a result of the at least one or all of the plurality of determination items determined by the computer at the time point before the subject vehicle passes through the switch determination point, the computer is configured to determine the at least one or all of the plurality of determination items and/or the other of the plurality of determination items at the time point when or after the subject vehicle passes through the switch determination point; and
the computer is configured to switch from automated driving to manual driving on condition that results of determining all of the plurality of determination items are positive after the computer determines the at least one or all of the plurality of determination items and/or the other of the plurality of determination items at the time point when or after the subject vehicle passes through the switch determination point.

11. The automated driving system according to claim 1, wherein
the determiner is configured to:
at the time point before the subject vehicle passes through the switch determination point, determine a portion of all of the plurality of determination items; and at the time point when or after the subject vehicle passes through the switch determination point, determine all of the plurality of determination items, and the driving switch controller is configured to switch from automated driving to manual driving on condition that all of the plurality of determination items determined by the determiner at the time point when or after the subject vehicle passes through the switch determination point are positive.

12. The automated driving switch determination program product according to claim 7, wherein:

the instructions cause the controller to:

at a time point before the subject vehicle passes through the switch determination point, determine a portion of all of the plurality of determination items; and at a time point when or after the subject vehicle passes through the switch determination point, determine all of the plurality of determination items; and switch from automated driving to manual driving on condition that all of the plurality of determination items determined at the time point when or after the subject vehicle passes through the switch determination point are positive.

13. The automated driving switch determination program product according to claim 12, wherein:

the instructions cause the controller to:

at the time point before the subject vehicle passes through the switch determination point, determine a portion of all of the plurality of determination items; and at the time point when or after the subject vehicle passes through the switch determination point, determine all of the plurality of determination items; and switch from automated driving to manual driving on condition that all of the plurality of determination items determined at the time point when or after the subject vehicle passes through the switch determination point are positive.

14. The automated driving system according to claim 10, wherein the computer is configured to:

at the time point before the subject vehicle passes through the switch determination point, determine a portion of all of the plurality of determination items; and at the time point when or after the subject vehicle passes through the switch determination point, determine all of the plurality of determination items, and the computer is configured to switch from automated driving to manual driving on condition that all of the plurality of determination items determined by the computer at the time point when or after the subject vehicle passes through the switch determination point are positive.

* * * * *